United States Patent
Mo

(10) Patent No.: US 11,240,123 B2
(45) Date of Patent: *Feb. 1, 2022

(54) DYNAMIC ADAPTIVE NETWORK

(71) Applicant: Comcast Cable Communications, LLC, Philadelphia, PA (US)

(72) Inventor: Richard Mo, Colorado Springs, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,772

(22) Filed: Jul. 2, 2019

(65) Prior Publication Data

US 2020/0136926 A1 Apr. 30, 2020

Related U.S. Application Data

(63) Continuation of application No. 15/059,963, filed on Mar. 3, 2016, now Pat. No. 10,389,601.

(60) Provisional application No. 62/127,519, filed on Mar. 3, 2015.

(51) Int. Cl.
*H04W 72/04* (2009.01)
*H04L 12/26* (2006.01)
*H04L 12/24* (2006.01)

(52) U.S. Cl.
CPC .......... *H04L 41/50* (2013.01); *H04L 41/0896* (2013.01); *H04L 41/509* (2013.01); *H04L 43/0894* (2013.01); *H04L 43/16* (2013.01)

(58) Field of Classification Search
CPC ................ H04L 41/50; H04L 41/5003; H04L 41/5038; H04L 41/0894; H04L 41/0895; H04L 41/0896; H04L 41/509; H04L 41/5087; H04L 65/00; H04L 43/16; H04L 43/12; H04L 43/14; H04L 47/76; H04N 21/00
USPC ......................................................... 370/270
See application file for complete search history.

(56) References Cited

U.S. PATENT DOCUMENTS

| | | | |
|---|---|---|---|
| 6,546,016 B1 * | 4/2003 | Gerszberg ............ | H04Q 3/0016 370/401 |
| 2002/0181401 A1 | 12/2002 | Hagirahim et al. | |
| 2008/0031212 A1 * | 2/2008 | Ogura ................... | H04W 28/16 370/338 |
| 2008/0232267 A1 | 9/2008 | Kim et al. | |
| 2009/0180430 A1 | 7/2009 | Fadell | |
| 2010/0293275 A1 * | 11/2010 | Rezaiifar .............. | H04L 47/215 709/225 |
| 2012/0166608 A1 * | 6/2012 | Ogata ..................... | H04L 69/22 709/223 |
| 2013/0051331 A1 * | 2/2013 | Bao ....................... | H04W 28/24 370/329 |
| 2013/0070619 A1 * | 3/2013 | Anthony, Jr. ......... | H04W 24/02 370/252 |

(Continued)

*Primary Examiner* — Phong La
(74) *Attorney, Agent, or Firm* — BakerHostetler

(57) ABSTRACT

Systems and methods for managing a network are disclosed. In certain systems and methods, access to a network such as a wireless network, can be granted or denied based upon a threshold number of devices accessing the network. Moreover, access to a first service available over the network can be granted or denied based upon a threshold number of devices accessing the first service. Various network resource can be allocated to the first service based at least upon the number of device access the first service.

17 Claims, 9 Drawing Sheets

(56) References Cited

U.S. PATENT DOCUMENTS

| | | | |
|---|---|---|---|
| 2013/0212270 A1* | 8/2013 | Hsieh | H04L 47/72 709/225 |
| 2015/0103785 A1* | 4/2015 | Jung | H04W 24/10 370/329 |
| 2015/0131545 A1* | 5/2015 | Ameigeiras Gutierrez | H04W 72/1236 370/329 |
| 2015/0350083 A1* | 12/2015 | Goodson | H04L 47/783 370/236 |
| 2016/0191532 A1* | 6/2016 | Seiver | H04L 63/101 726/4 |

* cited by examiner

DYNAMIC ADAPTIVE NETWORK

CROSS-REFERENCE TO RELATED APPLICATIONS

This application is a continuation of U.S. patent application Ser. No. 15/059,963, filed Mar. 3, 2016, which claims the benefit of U.S. Provisional Patent Application No. 62/127,519, filed Mar. 3, 2015, each of which are hereby incorporated by reference in their entirety.

BACKGROUND

A network such as a local area network can comprise an access point (AP) to provide a means for one or more user devices to communicate with and/or over the network. An access point can comprise a device that allows wired and/or wireless user devices to connect to a wired network using Wi-Fi, Bluetooth, or related standards. An access point can be configured to provide access to one or more services such as, for example, a private network, public network, or network-related services. One or more access points can be deployed to provide an in-premises wireless network, such as a residential or business network environment. As networks such as home premises networks evolve from serving simple data cable modems to delivering multiple sophisticated multimedia services to rapidly changing mobile consumer electronic devices, a new framework to manage the resulting complex service delivery and environment is required. The shortcomings of the prior art are addressed by the present disclosure.

SUMMARY

Applicant discloses systems and methods for controlling access to a network and services accessible via the network.

In an aspect of the present disclosure, a network (e.g., dynamic adaptive network (DAN)) can be configured to manage access to one or more services provided via a network. As an example, the network can comprise one or more controllers, extenders, and user devices (e.g., clients) configured to manage multiple devices accessing the network and/or the network connection resources of the network to maximize service performance provided via the network. As an example, the networks of the present disclosure can be configured to dynamically adapt various network connections (e.g., Wi-Fi) to address the specific requirements of the services being supported and to adjust to the changing network connection environment. Such adaptation can be based on specific requirements of the services being accessed and/or based on a number of devices accessing the network and services.

In certain methods, access to a network such as a wireless network, can be granted or denied based upon a threshold number of devices accessing the network. Moreover, access to a first service available over the network can be granted or denied based upon a threshold number of devices accessing the first service. Various network resource can be allocated to the first service based at least upon the number of device access the first service.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
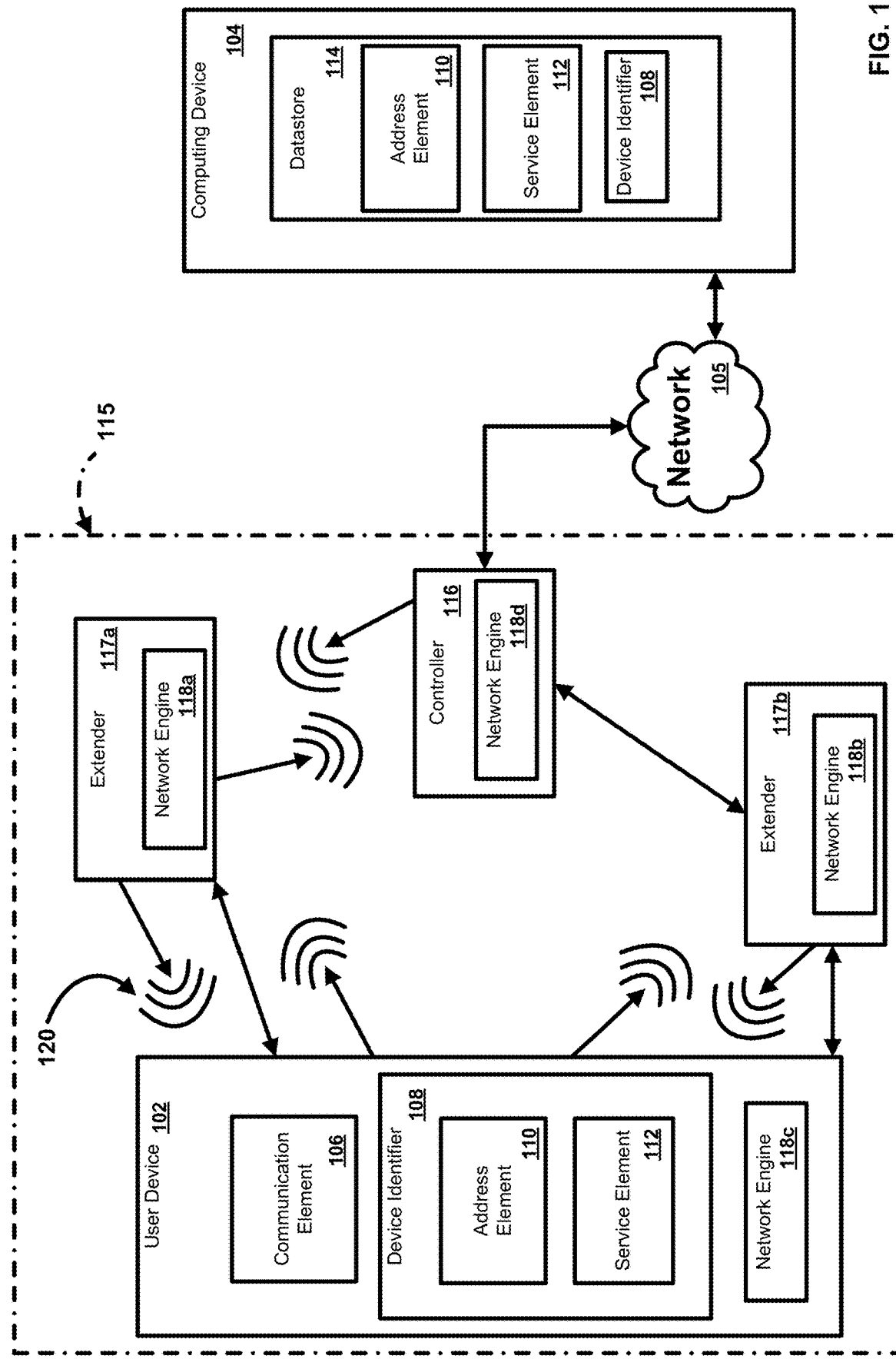
FIG. 1 is a block diagram of an example system and network.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or other networks (e.g., wide area networks). Other forms of communications can be used such as wired and wireless telecommunication channels, for example.

The user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback such as an application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

The user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

The device identifier 108 can comprise an address element 110 and a service element 112. The address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

The service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. Such services can comprise voice services, broadband services, video services, and high speed data services. Other information can be represented by the service element 112.

The computing device 104 can be a server for communicating with the user device 102. As an example, the computing device 104 can communicate with the user device 102 for providing services. The computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

The computing device 104 can manage the communication between the user device 102 and a datastore 114 for sending and receiving data therebetween. As an example, the datastore 114 can store a plurality of data sets (e.g., mapped identifiers), relational tables, content assets, user device identifiers (e.g., identifier 108) or records, network device identifiers, or other information. As a further example, the user device 102 can request and/or retrieve a file from the datastore 114 such as a content asset. The datastore 114 can store information relating to the user device 102 such as the address element 110 and/or the service element 112. As an example, the computing device 104 can obtain the device identifier 108 from the user device 102 and retrieve information from the datastore 114 such as the address element 110 and/or the service elements 112. As an example, information relating to a plurality of services can be stored in the datastore 114 and can be accessed by one or more user device 102. Such service-related data can comprise one or more of a video service data, a voice service data, and a high-speed data service information.

The network 115 (e.g., dynamic adaptive network, local area network, etc.) can comprise a controller 116, one or more network extenders 117a, 117b, and one or more clients such as the user device 102, for example. One or more connections linking the controller 116 with the clients (e.g., user device 102) can comprise Wi-Fi, MoCA, Ethernet or a combination of wired and wireless connection segments. As an example, the controller 116 can be or comprise a gateway device, the extenders 117a, 117b can be or comprise a Wireless Ethernet Cable Bridge (WECB), and the clients can be or comprise the user device 102.

The components of the network 115 can be connected as a local area network (LAN), for example, within a premises. As an example, the client can be connected remotely from a wide area network into the controller 116 connected to the LAN (e.g., located inside the premises). As another example, the controller 116 can be hosted remotely from the LAN and configured to control one or more extenders 117a, 117b and clients connected to the LAN (e.g., located inside the premises). In certain aspects, to facilitate clients connecting from both outside and within the premises, the communications framework of the network 115 can be configured to extend past the premises to cover at least a portion of the external wide area access networks. As an example, layered architecture over a software stack such as Reference Design Kit (RDK) and Reference Design Kit for broadband (RDK-B) with Cisco Certified Security Professional CCSP/D-Bus enables the components of the network 115 to be distributed over wide area networks and thereby facilitates communications within the customer premises and across wide area network boundaries. As an example, the RDK is a software stack with localization plugins created to accelerate the deployment of next-gen video products and services by multichannel video providers (MVPDs). The RDK can be configured to enable MVPDs to standardize certain elements of these products and devices such as set-top boxes, gateways, and converged devices, and to easily customize the applications and user experiences that ride on top. The RDK can be logically disposed below the MVPD application and services layer and can provide a common interface to systems on a chip (SoC) (e.g., operating as a universal SoC adapter). The RDK can provide a common method to manage complex video functions such as tuning, conditional access, DRM, and stream management. As a further example, the RDK and RDK-B allow the system to be distributed in the D-Bus communications infrastructure. Hardware abstractions can be used to insulate certain components (e.g., network engine 118a, 118b, 118c, 118d) from specific hardware variances used across the network 115.

The controller 116 can be or comprise a logical entity that can be configured to host one or more network services such as home network service delivery capabilities needed to serve the clients. The controller 116 can be embodied in a single physical device such as a home network gateway or it can be distributed over multiple hosting devices.

The extenders 117a, 117b can be or comprise a logical entity that extends some specific capabilities, such as Wi-Fi radio, of the controller 116. The extenders 117a, 117b can be or comprise a dedicated device such as the WECB extending the Wi-Fi radio of a home network gateway. The extenders 117a, 117b can be or comprise a logical element provided by a more general purpose device. For example, a home network gateway can function as a Wi-Fi extender (e.g., extenders 117a, 117b) to the controller 116 operating inside a cloud-based gateway.

The client (e.g., user device 102) can be or comprise a logical entity controlled by the controller 116 to deliver services to a user. The client can be or comprise a dedicated device connected to a display such as a television. The client can be or comprise a software application hosted by a smartphone or tablet or other user device. The client can be physically connected to one or more extenders 117a, 117b but logically connected to the controller 116 (e.g., via the extenders 117a, 117b). Other configurations and connection can be used.

One or more of the controller 116, extenders 117a, 117b, and clients can comprise a network engine 118a, 118b, 118c, 118d. The network engines 118a, 118b, 118c, 118d can comprise logic elements configured to manage network related functions. The network engine 118a, 118b, 118c, 118d can be configured with one or more logical/physical components such as a service monitor, service adaptor, connection adaptor, and service interworking, as described in further detail below.

The service monitor can be configured to manage the aspects of the network 115 including, for example, tracking and mapping interconnections of extenders 117a, 117b and/or clients on the network 115, and tracking the services being delivered through the network 115. For example, the service monitor can be configured to poll the components of network 115 for link performance and can assess if the link performance along the service delivery path is consistent with the performance requirements of the service being delivered.

The connection adaptor can be configured to map the link performance data from service monitor against the link performance required by the service being deliver and can adapt link connection performance parameters accordingly to compensate any degradation.

The service adaptor can be configured to map the service performance data from service monitor to determine whether the service performance parameters can be adapted to within the reported performance environment and can change the performance parameters appropriately.

The service interworking can be based on the service data received to trigger service interworking functions. For example, in an Internet of Thing service interworking scenario, a simple rule such as "[i]f the door sensor is open, turn on the light" may be implemented. Another example service interworking function may involve responding to a voice callby notifying all devices that are streaming video.

The network engine 118d comprised in the controller 116 can be configured to manage one or more of the following functions:

Process received service performance data and decide specific service and connection adaptations needed to maintain or improve service delivery performance;
Change, via RDK-B, service delivery operating parameters and connection parameters on the controller 116;
Manage radios parameters, such as channel selection and radiating power level, on all Wi-Fi radios of the controller 116 and all associated extenders 117a, 117b to minimize interference and optimize the radio performance;
Instruct appropriate extenders 117a, 117b to change service delivery operating parameters and connection operating parameters;
Prioritize resource assignment to improve or maintain delivery performance of all managed services ahead of non-managed and best effort high-speed data HSD traffic;
Implement selected interworking features between services;
Implement admission control to ensure admitted clients receive adequate delivery performance;
Register clients to collect service performance parameters;
Instruct associated clients to change service delivery operating parameters and connection parameters;
Provide network management support functions to back office systems;
Operate independently without any extenders 117a, 117b or specialized client if necessary.

The network engine 118a, 118b comprised in the respective extenders 117a, 117b can be configured to manage the following functions:

Provide transport connection between the controller 116 and the clients;
Receive and execute service and connection adaptation instructions from the controller 116;
Extend Wi-Fi and Ethernet connections reach from controller 116 to clients;

The network engine 118c comprised in the client can be configured to manage the following functions:

Securely and non-repudiatedly identify the user.
Collect service performance parameters and report to the controller 116;
Receive and execute service and connection adaptation instructions from the controller 116.
Interface and control CE resources to enhance services and user experience in conjunction with controller 116.

Different traffic types may have different levels of QoS requirements. As such, the network engines 118a, 118b, 118c, 118d can be configured to classify downstream traffic types and assign appropriate prioritizations to different traffic flows accordingly. As an example, multiple prioritized service upstream traffic queues can be managed through a TR-181 device based on:

1) ingress traffic source and destination IP address combinations;
2) DSCP code points; or
3) explicit per application.

For downstream traffic management, for example, a similar model may apply except that ingress is from the WAN network or generated by an application, such as MDC, running internal to the components of the network 115, while egress are LAN connections such as a specific SSID of a Wi-Fi radio, Ethernet, or MoCA.

On order to use DSCP marking to classify the downstream traffic, different downstream traffic types may be marked with appropriate DSCP markings. For example, downstream managed voice traffic can be marked with DSCP point codes that are mapped to EF traffic flows. Managed video/audio traffic can be marked with DSCP point codes that mapped to AF traffic flows. In certain aspects, best effort HSD downstream traffic can be marked with DSCP point codes that are mapped to BE traffic flows.

In another aspect, the network engines 118a, 118b, 118c, 118d can be configured to support the following prioritization of downstream traffic:

managed voice traffic can flow through to the EF queues for all LAN connection types;
managed video traffic can flow through to the AF queues for all LAN connection types;

other best effort HSD traffic can flow through to the BE queues for all connection types;
non-managed voice traffic can flow through to specific OTT voice queue, e.g. queue 4 for all connection types;
non-managed video traffic can flow through to specific OTT video queue, e.g. queue 5 for all connection types;
the traffic scheduler/shaper can prioritize managed service traffic ahead of non-managed and best effort HSD traffic.

With the downstream traffic classification and queuing process in place, all managed traffic will be delivered with the appropriate priority and treatment the specific services required.

Figure 2:
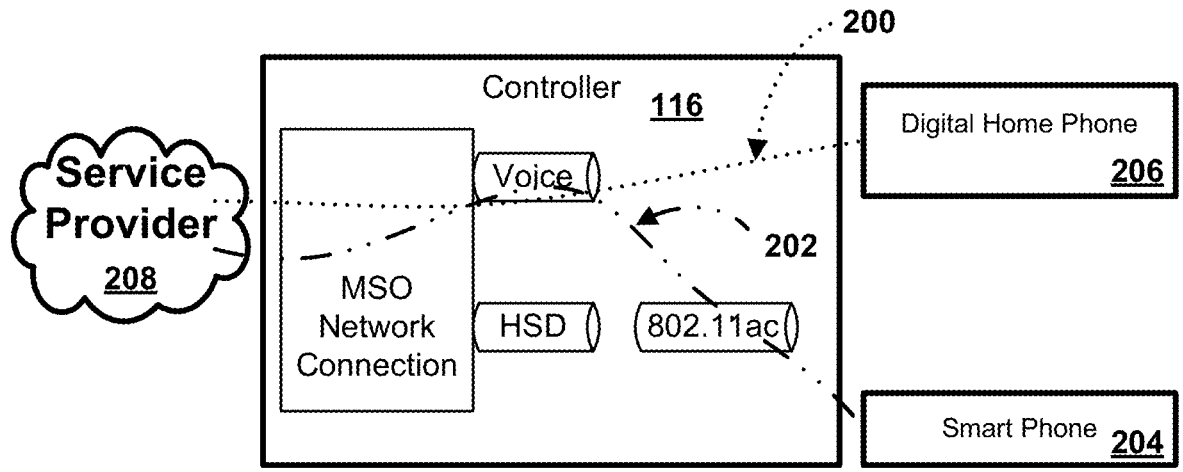
FIG. 2 is a block diagram of an example system and network.

FIG. 2 illustrates a use case when a user is within a premises using a smart phone 204 (e.g., the user device 102, network client) to execute a communications application for digital voice service. The smart phone 204 can be connected through the controller 116 (e.g., a home gateway device) and registered with a service provider 208 of a voice service. When an incoming call for the user is received by the service provider 208, a first call appearance 200 can be sent via the controller process flow to the controller 116, for example to a digital home phone 206. A second call appearance 202 can be delivered via the application flow (e.g., via 802.11xx) to the smart phone 204. Traditionally, the application data would flow through a gateway device as part of the HSD traffic. However, with downstream traffic flow queuing treatment, in accordance with an aspect of the present disclosure, the application traffic flow can be recognized as a managed voice traffic and flow through the appropriate voice downstream service flow priority, yielding an improved service experience.

Figure 3:
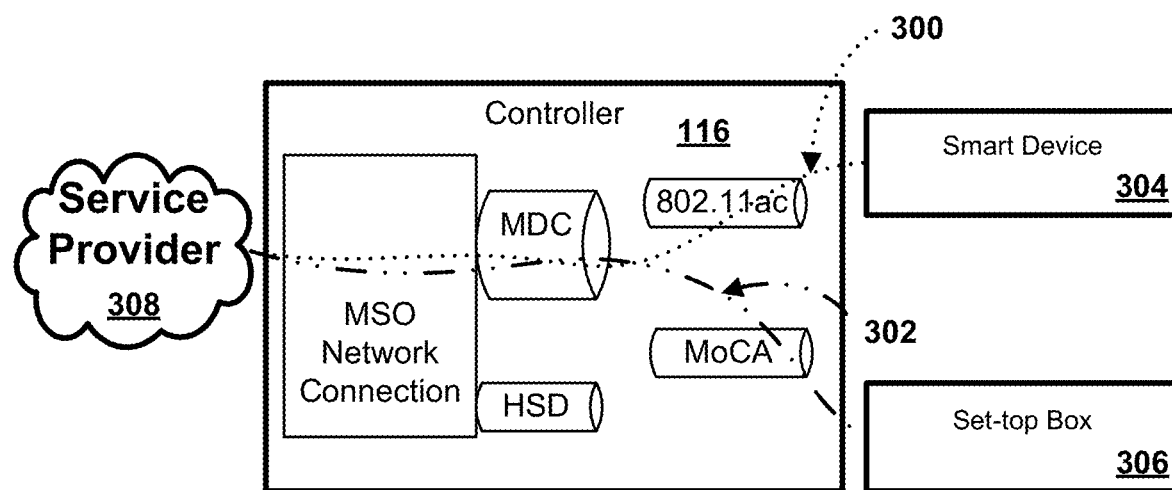
FIG. 3 is a block diagram of an example system and network.

FIG. 3 illustrates a use case where a user is accessing a video streaming service provided by a service provider 308, using the controller 116 connected via a MoCA port. As an example, the user is accessing video streaming via a set-top box 306 over the MoCA port service flow 302. In parallel, using a smart phone 304 (e.g., the user device 102, network client) with a video streaming application, the user can be connected through a Wi-Fi port on the controller 116 to access the video streaming service. Normally, the video application flow would pass through a gateway device as part of the HSD traffic. However, with downstream traffic flow queuing treatment, the video traffic from the MDC designated for the video application will be recognized as a managed video traffic and flow through the video Wi-Fi video downstream service flow priority 300, yielding an improved experience.

Network connections such as Wi-Fi connections can vary drastically depending on the capabilities and physical location of the clients in relation to the access point. For example, the radio signal strength degrades exponentially as the client moves away linearly from the Wi-Fi access point. Thus a distant client may occupy the Wi-Fi radio longer than a close-by client to receive the same amount of data. This problem is compounded with a low capacity client using, say 802.11b, to connect to the system at the edge of the radio coverage of an 802.11ac Wi-Fi radio. While the slow and distant client is being served, all other clients are potentially blocked for a long time making performance of all real-time communications such as voice and video streaming unacceptable.

Returning to FIG. 1, in order to minimize occurrences of one client device delaying or blocking communications to other client devices, the traffic scheduler/shaper logic for the Wi-Fi radio controlled by one or more of the network engines 118a, 118b, 118c, 118d implements a resource allocation scheme based on a pseudo Time Division Multiplex (TDM) scheme. As an example, each client can be assigned a specific number of time slots based on the actual services it is accessing to guarantee service delivery if necessary. This pseudo TDM scheme does not require straight time slot synchronization and the size of the time slot can dynamically be determined by the controller 116. As an example, a Wi-Fi Radio access point can employ features such as Enhanced Distributed Coordination Function (EDCF) to seize the radio channel with appropriate priorities to deliver traffic to selected client based on the supported service required. As another example, the number and regularity of TDM slots allocated to a service can be determined based on the bandwidth and latency requirements of the service to be supported.

As an illustrative example, three clients can be connected to an access point. Client 2 and 3 are accessing only HSD service, no managed voice or managed video service. Client 1 is accessing Live HD video streaming, a managed video service, along Best Effort HSD services. The access point is delivering requested traffic to all three clients. From the perspective of the access point, the highest priority service accessed is managed Live HD video streaming by client 1, which requires, say 2 of every 3 TDM slots to give it the best performance. It thus allocated 2 of every 3 TDM slots to client 1. It allocated slot 1 and slot 7 to client 2 and slot 4 and slot 10 were allocated to client 3 and so on. By the time of slot 11, client 1 has terminated all the managed services, thus the AP reduces the TDM priority of client 1 to Best Effort, the same as client 2 and 3. Since there are only three clients, they each gets 1 of every 3 TDM slots. The allocation of TDM slots to any client may be determined dynamically depending on the actual services the client is accessing.

Service-based allocation of Wi-Fi TDM slots can form the basis of prioritized access. However, as the radio network condition changes, the actual bandwidth of each of the allocated TDM slots varies. In order to maintain a stable usable bandwidth to serve the specific service that the user is accessing, the actual number and regularity of TDM slots assigned can be adjusted based on the actual Wi-Fi link condition. As a example, the number of TDM slots allocated can be adjusted (e.g., periodically or continuously) to compensate for the bandwidth lost due to the dynamic radio link condition changes. Such a process can maintain a stable bandwidth throughput and latency required by the supported service.

The controller 116 can be configured to manage radio channel and frequency planning for the components of the network 115. As an example, the controller 116 can be configured to coordinate assignments of selected radio parameters, such as the channel selection and radiating power levels of one or more Wi-Fi radios, to minimize interference and optimize the radio performance for the network 115. As another example, when one of the extenders 117a, 117b is initiated, the extender 117a, 117b can register with the controller 116 and can implement a radio startup process such as DFS, Automatic Channel Selection, and/or a radio parameters configuration process, and a set of radio operating parameters can be assembled. The extender 117a, 117b can forward the radio network planning specific parameters to the controller 116. Upon receipt of these parameters, the controller 116 can generate a radio map based on radio data relating to the extender 117a, 117b and controller 116 and can determine if adjustments are needed to be made to the parameters in order to minimize interference and to optimize the radio performance. If adjustments are made, the controller 116 can send the adjusted parameters to the extender 117*a*, 117*b* to execute.

The above radio planning process can be repeated whenever an extender 117*a*, 117*b* joins the network or any of the extender 117*a*, 117*b* or the controller 116 reboots. The controller 116 may also initiate this process when the radio network has degraded to a stage that a restart of the process is required.

A client access planning stage can be implemented when one or more clients join the network 115. As an example, an access request can be forwarded to the controller 116, directly or via the extenders 117*a*, 117*b*. The controller 116 can coordinate with the extenders 117*a*, 117*b* to determine which Wi-Fi radio is best positioned to serve a particular client based on radio environment, load condition, and user profile. As a result of the assessment, the client may be steered to a different band, to a different SSID, or a different access point. As a further example, the client access planning stage can be implemented when the process load on one or more access pointed (e.g., radios or the radio link to the client) has deteriorated beyond a threshold.

Figure 4:
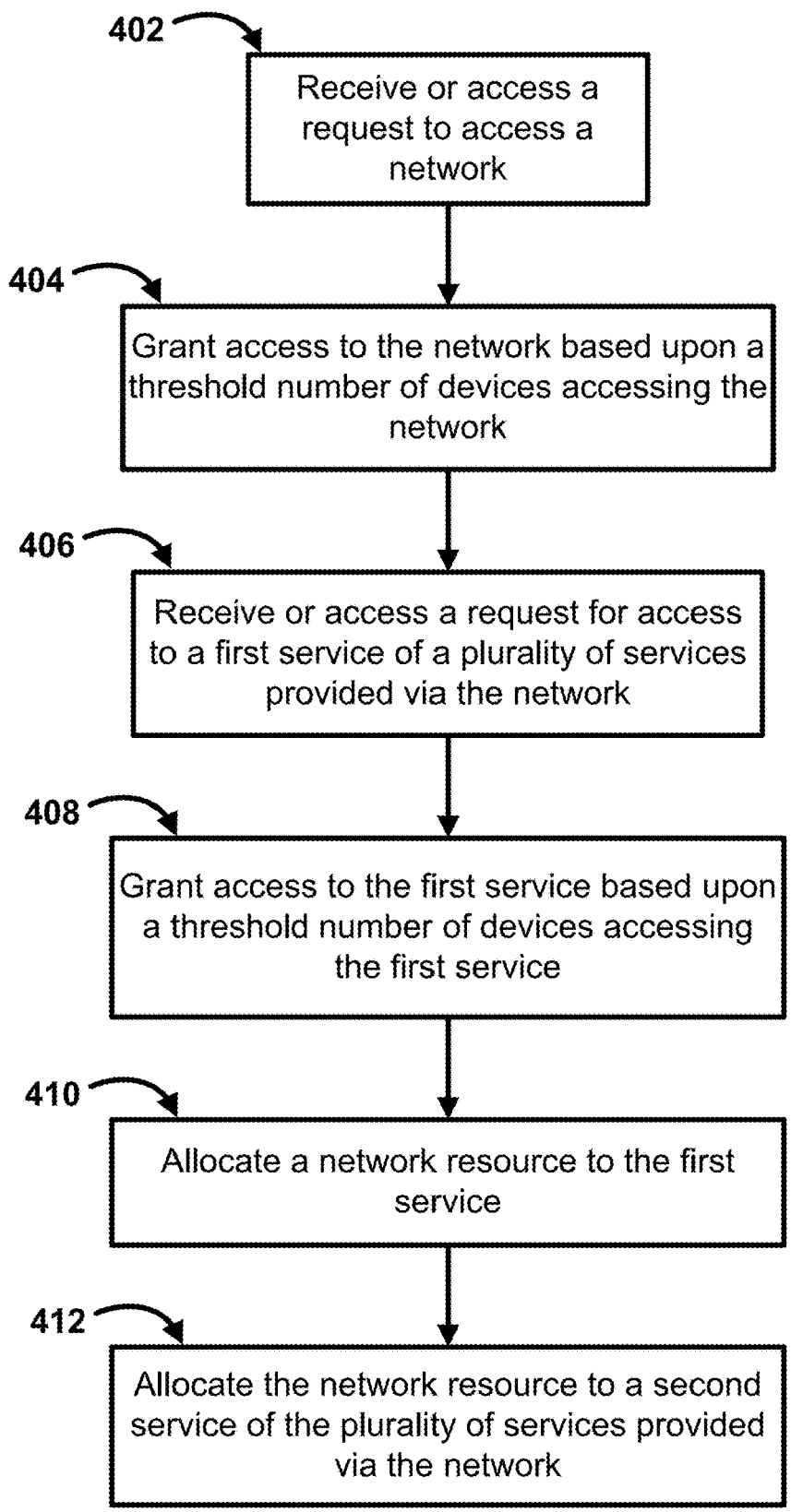
FIG. 4 is a flow chart of an example method.

An exemplary method for controlling access to a network and network services is shown in FIG. 4. In operation or step 402, a request for access to a network can be received or accessed, for example, by the controller 116 (FIG. 1). Such a request may be received or accessed from a user device such as user device 102. In operation or step 404, access to the network can be granted or denied based upon a threshold number of devices accessing the network and in response to the request for access to the network. For example, the controller 116 can process one or more requests for network access (e.g., Wi-Fi connection) based upon a number of total devices allocated for a particular SSID. If the number of total devices accessing the network 115 is below a threshold, a software stack (e.g., RDK-B) can facilitate the admission protocol for allowing the requesting device access to the network 115. Once the requesting devices are granted access to the network 115, the controller 116 can limit access to particular services provided via the network 115.

In operation or step 406, a request for access to a first service can be received, for example, by the controller 116 (FIG. 1). The first service can be one of a plurality of services provided via the network such as a local area network or home area network (e.g., premises network). As an example, the plurality of services provided via the network comprise one or more of a video service, a voice service, and a high-speed data (HSD) service.

In operation or step 408, access to the first service can be granted or denied based upon a threshold number of devices accessing the first service and in response to the request for access to the first service. As an example, a request for access to a first service (e.g., video streaming service) of a plurality of services provided via the network 115 can be received, for example by the controller 116. Access to the first service can be granted based upon a threshold number of devices (e.g., clients) accessing the first service and in response to the request for access to the first service. As the requesting devices access the first service (or other services provided via the network 115), the controller 116 can monitor network resource such as bandwidth. As an example, a network resource can be specifically allocated to the first service. Such allocations can be managed by one or more of the controller 116 and the software stack. The size and rules relating to the allocation may be fine-tuned over time based on field experience.

In operation or step 410, a network resource such as bandwidth can be allocated to the first service. As an example, allocating the network resource to the first service comprises allocating bandwidth to the first service based upon a dynamic partition scheme. As another example, allocating the network resource to the first service comprises allocating time-division multiplexing slots. As a further example, the first service is a video service and a selection of a maximum bitrate for initial provision of the first service can be received based at least one of the allocated network resource and a link condition.

In operation or step 412, the network resource can be allocated to a second service of the plurality of services provided via the network. The second service can be distinct from the first service.

In certain implementation of steps 408-412, service-based allocation of Wi-Fi TDM slots can form the basis of prioritized access. However, as the radio network condition changes, the actual bandwidth of each of the allocated TDM slots varies. In order to maintain a stable usable bandwidth to serve the specific service that the user is accessing, the actual number and regularity of TDM slots assigned can be adjusted based on the actual Wi-Fi link condition. As an example, the number of TDM slots allocated can be adjusted (e.g., periodically or continuously) to compensate for the bandwidth lost due to the dynamic radio link condition changes. Such an implementation can maintain a stable bandwidth throughput and latency required by the supported service.

Figure 5:
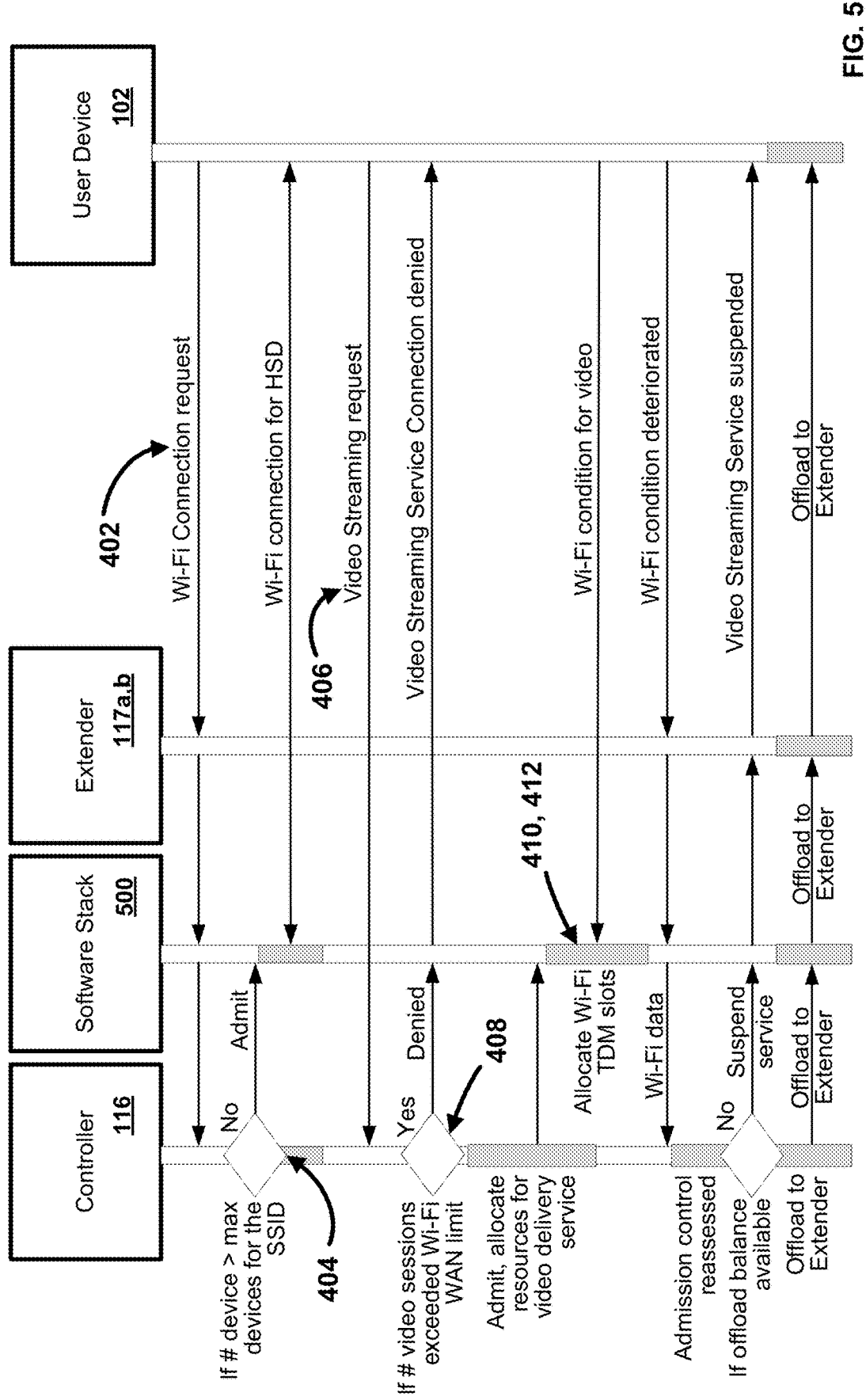
FIG. 5 is a diagrammatic view of an example data flow.

FIG. 5 illustrates an example process flow based on the implementation of one or more steps in the method of FIG. 4. The process flow of FIG. 5 relates to granting and denying admission of one or more devices (e.g., clients) to a network and or a service provided via the network. Such grants can be based upon a number of devices accessing the network and/or a number of devices accessing particular services provided via the network.

As an illustrative example, in reference to FIG. 5, an HD voice connection with an efficient codec, can consume less than about 100 kbps of bandwidth and a live HD video streaming connection with MPEG4 or HEVC codec, can require about 10 Mbps. As such, the bandwidth requirements of an HD voice channel are less than 1% of the requirements of a live HD video channel. Following this example and in reference to FIG. 5, a multifunction device, such as user device 102 can be accessing 1 HD voice service, 1 live HD video streaming service, and one or more HSD service sessions to collectively require about 12.5 Mbps of bandwidth. Furthermore, assuming a typical home network system needs to support 10-15 multifunction devices (e.g., user device 102) capable of accessing HD voice, HD video and HSD data simultaneously, a home premises may consume about 200 Mbps of service bandwidth. In order to avoid one traffic type overwhelming the others, the total bandwidth available can be partitioned into multiple configurable allocations or partitions with dedicated admission.

Access to the network 115 can be granted based upon a threshold number of devices accessing the network and in response to the request for access to the network. For example, the controller 116 can process one or more requests for network access (e.g., Wi-Fi connection) based upon a number of total devices allocated for a particular SSID. If the number of total devices accessing the network 115 is below a threshold, a software stack 500 (e.g., RDK-B) can facilitate the admission protocol for allowing the requesting device access to the network 115. Once the requesting devices are granted access to the network 115, the controller 116 can limit access to particular services provided via the network 115. As an example, a request for access to a first service (e.g., video streaming service) of a plurality of services provided via the network 115 can be received, for example by the controller 116. Access to the first service can be granted based upon a threshold number of devices (e.g., clients) accessing the first service and in response to the request for access to the first service. As the requesting devices access the first service (or other services provided via the network 115), the controller 116 can monitor network resource such as bandwidth. As an example, a network resource can be specifically allocated to the first service. Such allocations can be managed by one or more of the controller 116 and the software stack 500. The size and rules relating to the allocation may be fine-tuned over time based on field experience. As a further example, one allocation formulae may be set as follows:

Video (AF)=<80%; and

Voice (EF)+Best Effort HSD (BE)=<20%, where the boundary between AF and EF+BE traffic can be managed dynamically (e.g., responsively). For example, when there is no video service flow, the controller 116 can dynamically allocate all available bandwidth to admitted services. This traffic type partitioning scheme can also be setup to reflect different service profiles. For example: a video only subscription can be configured as Video (AF) =100% and VoiceHSD=0%; a HSD only or Voice and HSD subscription can be configured as VoiceHSD=100% and Video (AF)=0%.

In an aspect, certain rules for managing allocation of network resource can be informed by relative quality of service (QoS) requirements such as latency, jitter, packet loss, and throughput of different services. As an example, Table 1 illustrates relative comparisons of QoS requirements for certain services:

TABLE 1

|  | Latency | Jitter | Throughput | PacketLoss |
| --- | --- | --- | --- | --- |
| Live Streaming Video | Medium | Medium | Medium | High |
| Video Teleconferencing | High | High | Medium | High |
| Video on Demand | Low | Low | Medium | Low |
| Voice | High | High | Low | Medium |
| High Speed Data (Internet) | Low | Low | Medium | Low |

In another aspect, certain video service optimization processes can be facilitated via the controller 116 described herein. As an example, the video service optimization processes can improve IP live streaming video service delivery and the like. As another example, a number of radio air time TDM slots can be allocate to the particular Wi-Fi links connecting the user device 102 to the network 115 to maintain the bandwidth allocated. As a further example, if a particular service level cannot be maintained, certain services can be suspended to free up resources for other services. In certain aspect, the services can be offloaded to one or more extenders 117a,b, where such offloading may leverage the available resources of the extenders 117a,b to maintain service level for one or more services provided via the network 115.

Figure 6:
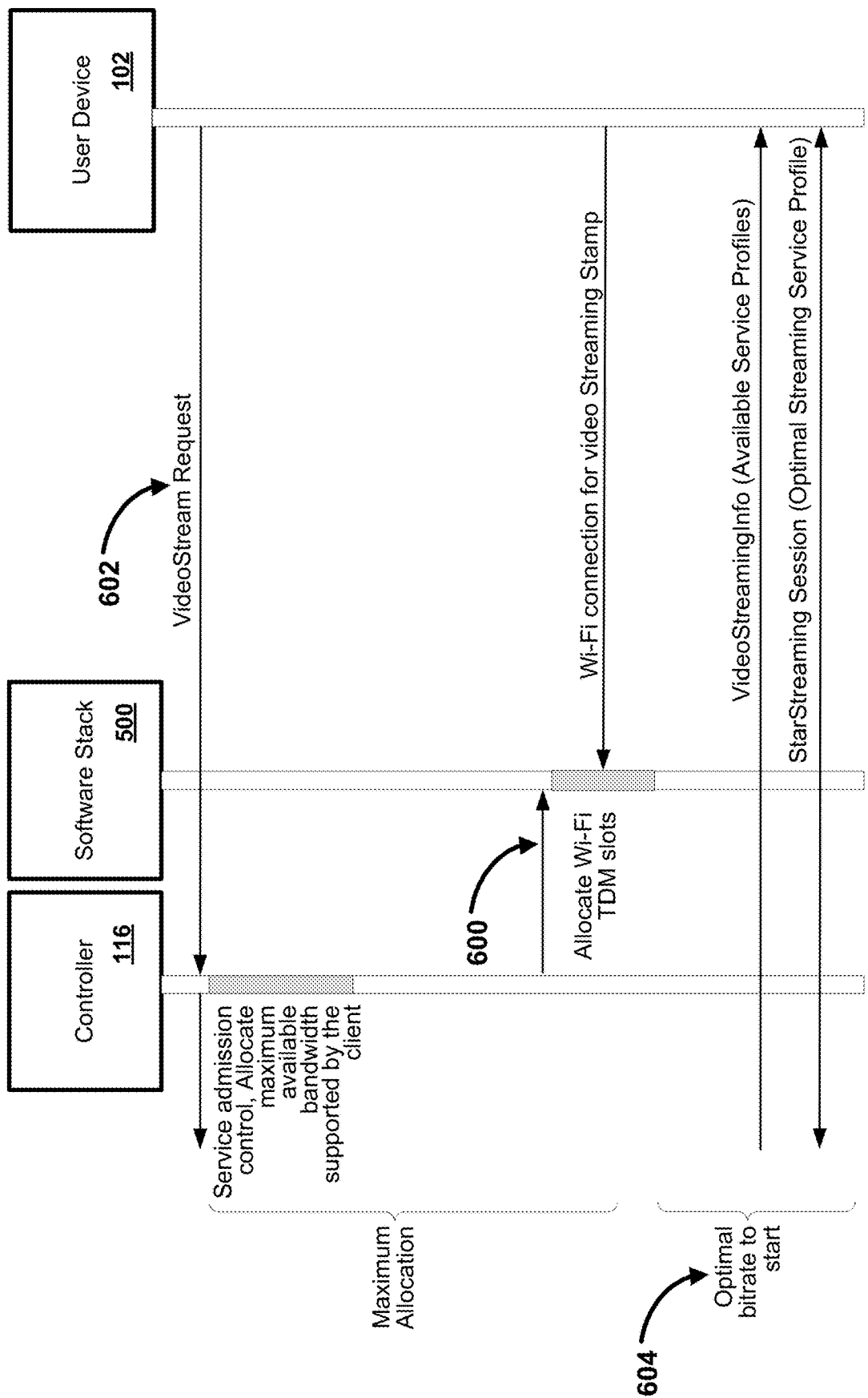
FIG. 6 is a diagrammatic view of an example data flow.

As illustrated in FIG. 6 and in reference to FIGS. 1 and 6, when one or more of the network engines 118a, 118b, 118c, 118d receives information indicating an imminent start of a video streaming session, the respective one or more of the network engines 118a, 118b, 118c, 118d can determine (e.g., from the connection to the client) the maximum bandwidth the client can support and based on the available bandwidth on the access point. As such, the network engines 118a, 118b, 118c, 118d can configure one or more Wi-Fi radios to allocate the maximum available bandwidth supported by the client to the connection. In certain aspects, a number of radio air time TDM slots can be allocate (e.g., via software stack 500) to the particular Wi-Fi links connecting the user device 102 to the network 115 to maintain the bandwidth allocated, at 600.

As an example, the user device 102 can request video streaming service from the controller 116, at 602. As another example, prior to the initiation of the video streaming service to the user device 102, a video client operating on the user device 102 can select the optimal video streaming bitrate it is capable of receiving at the start of the video streaming, at 604. This can maximize the video quality and minimize the lag time. As a further example, the optimal video streaming bitrate at the start of streaming can be controlled by the home network gateway (e.g., controller 116) via playlist information transparent to the video client. In certain aspects, the playlist can be intercepted by the controller 116 and lower bitrates other than the optimal bitrate removed prior to sending to the video client. This approach has the advantage of not impacting any of the video clients. After the initial streaming startup, the playlist with available streaming bitrate information need to be updated with all available streaming bitrates just in case the connection degraded and lower bitrates are needed.

Figure 7:
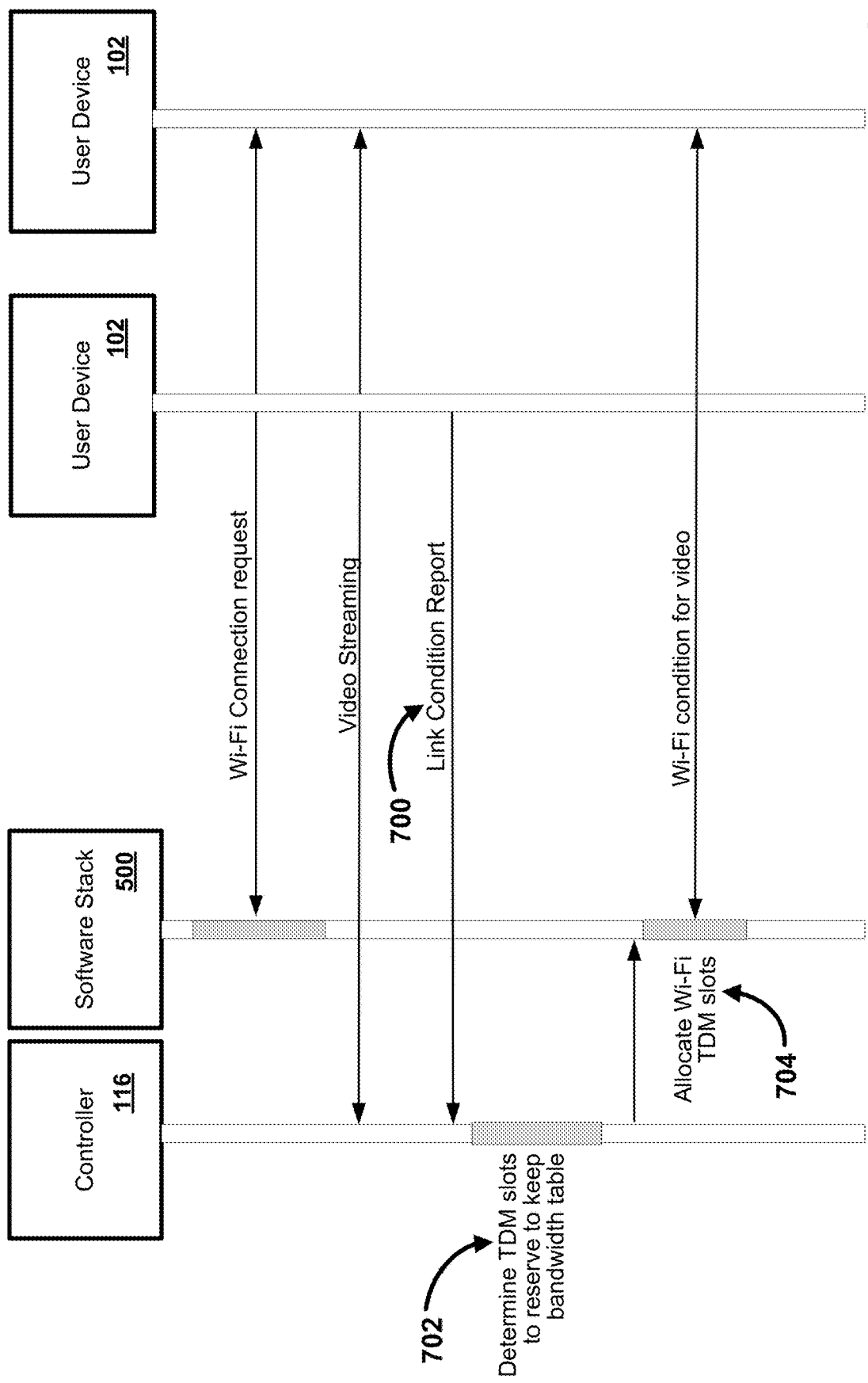
FIG. 7 is a diagrammatic view of an example data flow.

As illustrated in FIG. 7 and in reference to FIGS. 1 and 7, an ongoing video streaming session can be active over a network connection such as a Wi-Fi radio link. One or more of the network engines 118a, 118b, 118c, 118d (based on the link condition report data from the client) can determine the appropriate number of radio air time TDM slots to allocate to the Wi-Fi link connecting the client to maintain the bandwidth allocated. As an example, the Wi-Fi connection bandwidth may be adapted lower if the service requests can be handled adequately with a lower bandwidth and the bandwidth is needed elsewhere. There are a number of standards that can be used to obtain link condition report data during the measurement period, such as, estimated number of lost packets on the transmit side of the link, the maximum MAC throughput of the link, the estimated average percentage of time that the link is available for data transmissions, and the estimated RSSI in dB at the receive side of the link (when the media is Wi-Fi). As another example, one of the standards can be used is the Link Metric query message and Link Metric response message defined in IEEE 1905.1. In an aspect, when IEEE 1905.1 is supported, ALME primitives can be used to acquire link condition data such as packet error rate and MAC data rate. If IEEE 1905.1 is not supported, a low bitrate RTP stream with RTCP support can be established at the background to gather the link condition performance data. As such, the controller 116 can receive information relating to the condition of the links (e.g., link condition report data), at 700, and can update allocation of resources to maintain bandwidth allocation, at 702. In certain aspects, a number of radio air time TDM slots can be allocate (e.g., via software stack 500) to the particular Wi-Fi links connecting the user device 102 to the network 115 to maintain the bandwidth allocated, at 704.

Figure 8:
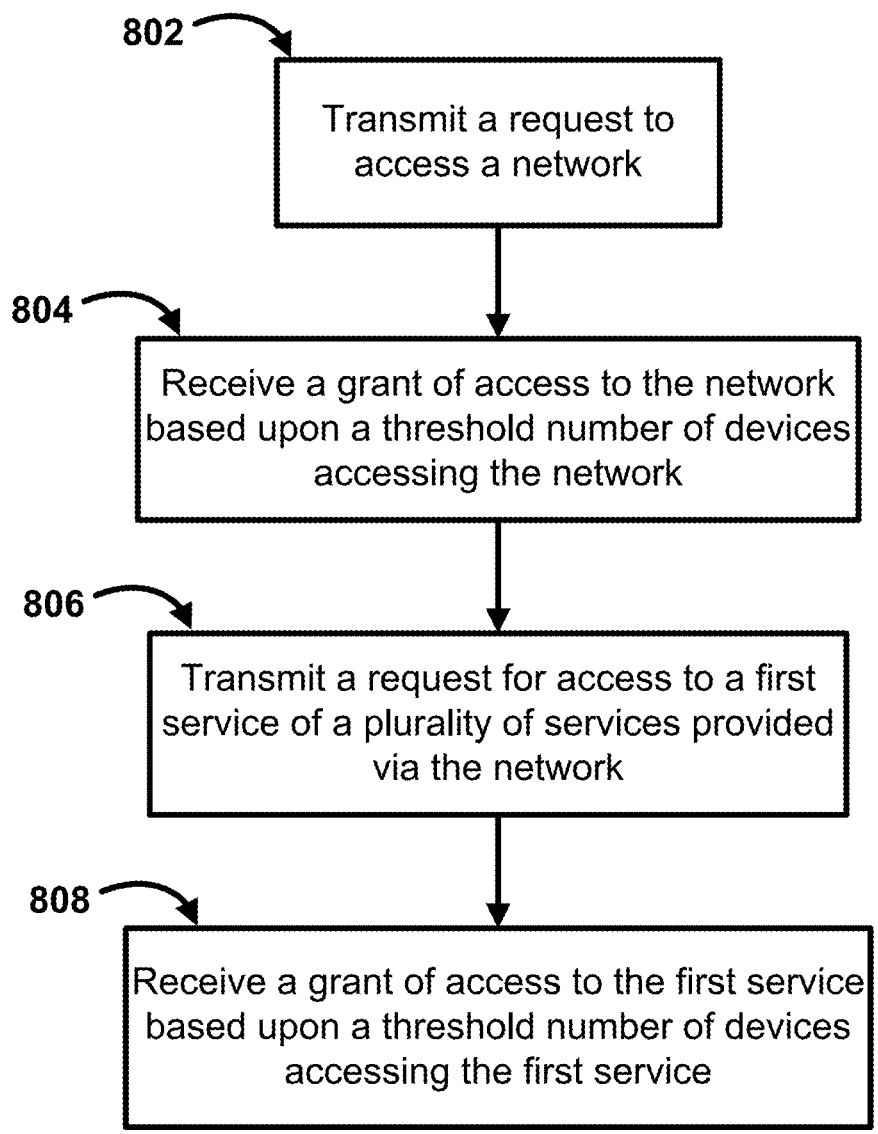
FIG. 8 is a flow chart of an example method.

An exemplary method for accessing a service by a client device is shown in FIG. 8. In operation or step 802, a request for access to a network can be transmitted, for example, via one or more clients (e.g., user devices 102 (FIG. 1)). In operation or step 804, a grant of access to the network can be received based upon a threshold number of devices accessing the network and in response to the request for access to the network. For example, the controller 116 can process one or more requests for network access (e.g., Wi-Fi connection) based upon a number of total devices allocated for a particular SSID. If the number of total devices accessing the network 115 is below a threshold, a software stack (e.g., RDK-B) can facilitate the admission protocol for allowing the requesting device access to the network 115. Once the requesting devices are granted access to the network 115, the controller 116 can limit access to particular services provided via the network 115.

In operation or step 806, a request for access to a first service of a plurality of services provided via the network can be transmitted, for example, via one or more clients (e.g., user devices 102 (FIG. 1)). The first service can be one of a plurality of services provided via the network. As an example, the plurality of services provided via the network comprise one or more of a video service, a voice service, and a high-speed data service. The network can be or comprise a LAN such as a premises network.

In operation or step 808, a grant of access to the first service can be received based upon a threshold number of devices accessing the first service and in response to the request for access to the first service. At least a portion of a network resource (e.g., bandwidth) can be allocated to the first service. As an example, allocating the network resource to the first service comprises allocating bandwidth to the first service based upon a dynamic partition scheme. As another example, allocating the network resource to the first service comprises allocating time-division multiplexing slots. As a further example, the first service is a video service and a selection of a maximum bitrate for initial provision of the first service can be received based at least on one of the allocated network resource and a link condition.

Figure 9:
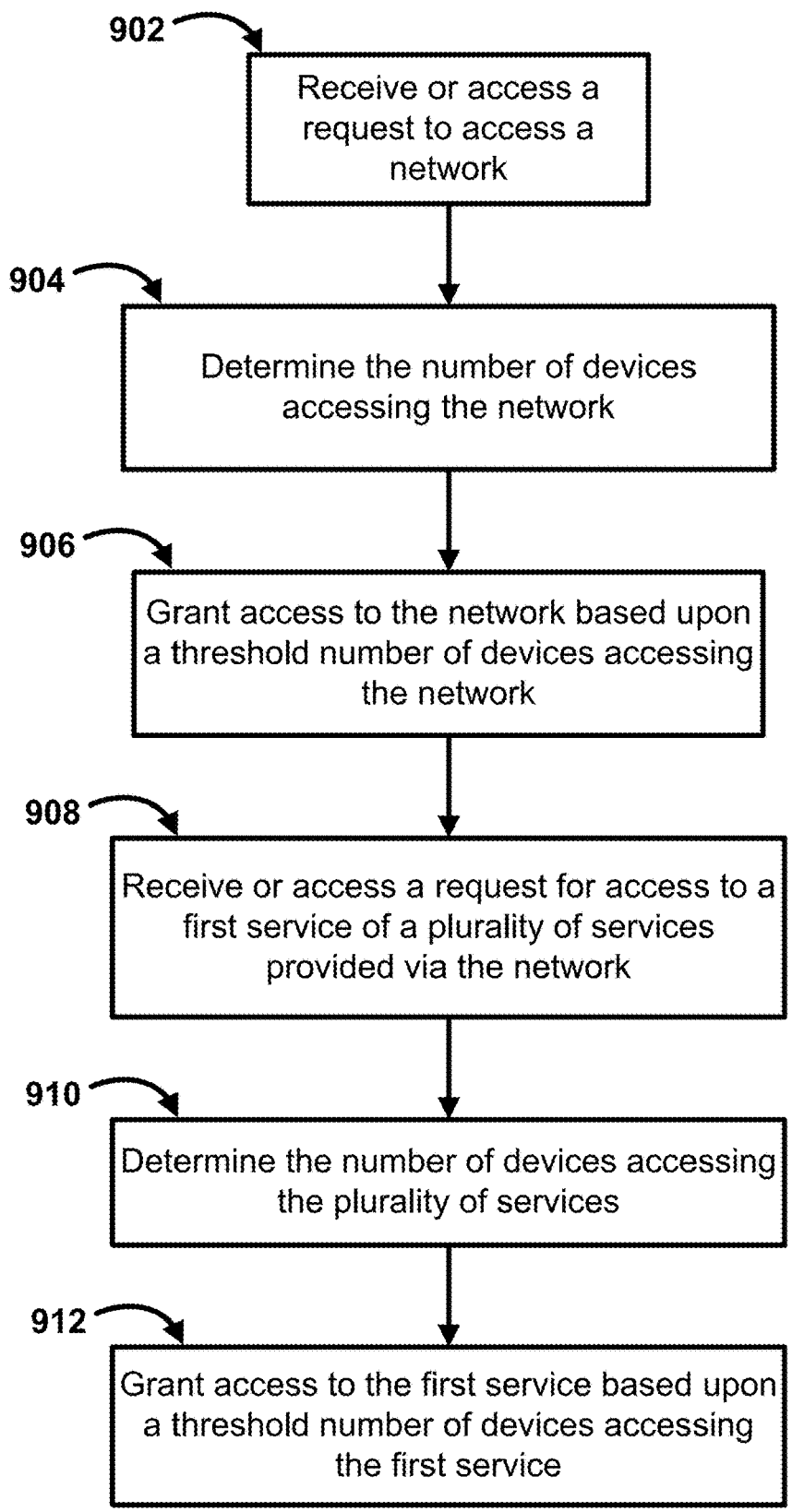
FIG. 9 is a flow chart of an example method.

An exemplary method for controlling access to network services is shown in FIG. 9. In operation or step 902, a request for access to a network can be received or accessed, for example, by the controller 116 (FIG. 1). In operation or step 904, a current number of devices accessing the network can be determined. As an example, one or more of the network engines 118a, 118b, 118c, 118d can be configured to comprise a network topology map (e.g., such as the service monitor function) of all devices connected to the network. From the topology map, the number of devices that are connected to each of the extenders 117a, 117b can be determined. Depending on the capacity of each of the extenders 117a, 117b, load balancing between direct connection to the controller 116 and the extenders 117a, 117b can also be exercised. In operation or step 906, access to the network can be granted or denied based upon a threshold number of devices accessing the network and in response to the request for access to the network.

For example, the controller 116 can process one or more requests for network access (e.g., Wi-Fi connection) based upon a number of total devices allocated for a particular SSID. If the number of total devices accessing the network 115 is below a threshold, a software stack (e.g., RDK-B) can facilitate the admission protocol for allowing the requesting device access to the network 115. Once the requesting devices are granted access to the network 115, the controller 116 can limit access to particular services provided via the network 115.

In operation or step 908, a request to access a first service can be received, for example, by the controller 116 (FIG. 1). The first service can be one of a plurality of services provided via the network. As an example, the plurality of services provided via the network comprise one or more of a video service, a voice service, and a high-speed data service. The network can be or comprise a LAN such as a premises network.

In operation or step 910, a current number of devices accessing each of the plurality of services provided via the network can be determined. One or more network engines 118a, 118b, 118c, 118d can be configured to determine the number of devices accessing each service. As an example, one or more of the service monitor and service adaptor (adaptation) functions can be used. As a further example, the service adaptor can track each of the service connections that are performing to effect needed QoS management adaptation. As a result, the service adaptor can determine how many service connections are present in total for each of the services supported. In operation or step 912, access to the first service can be granted based on the current number of devices each of the plurality of services service via the network.

In at least some aspects, a server that implements a portion or all of one or more of the technologies described herein may include a general-purpose computer system that includes or is configured to access one or more computer-accessible media.

Figure 10:
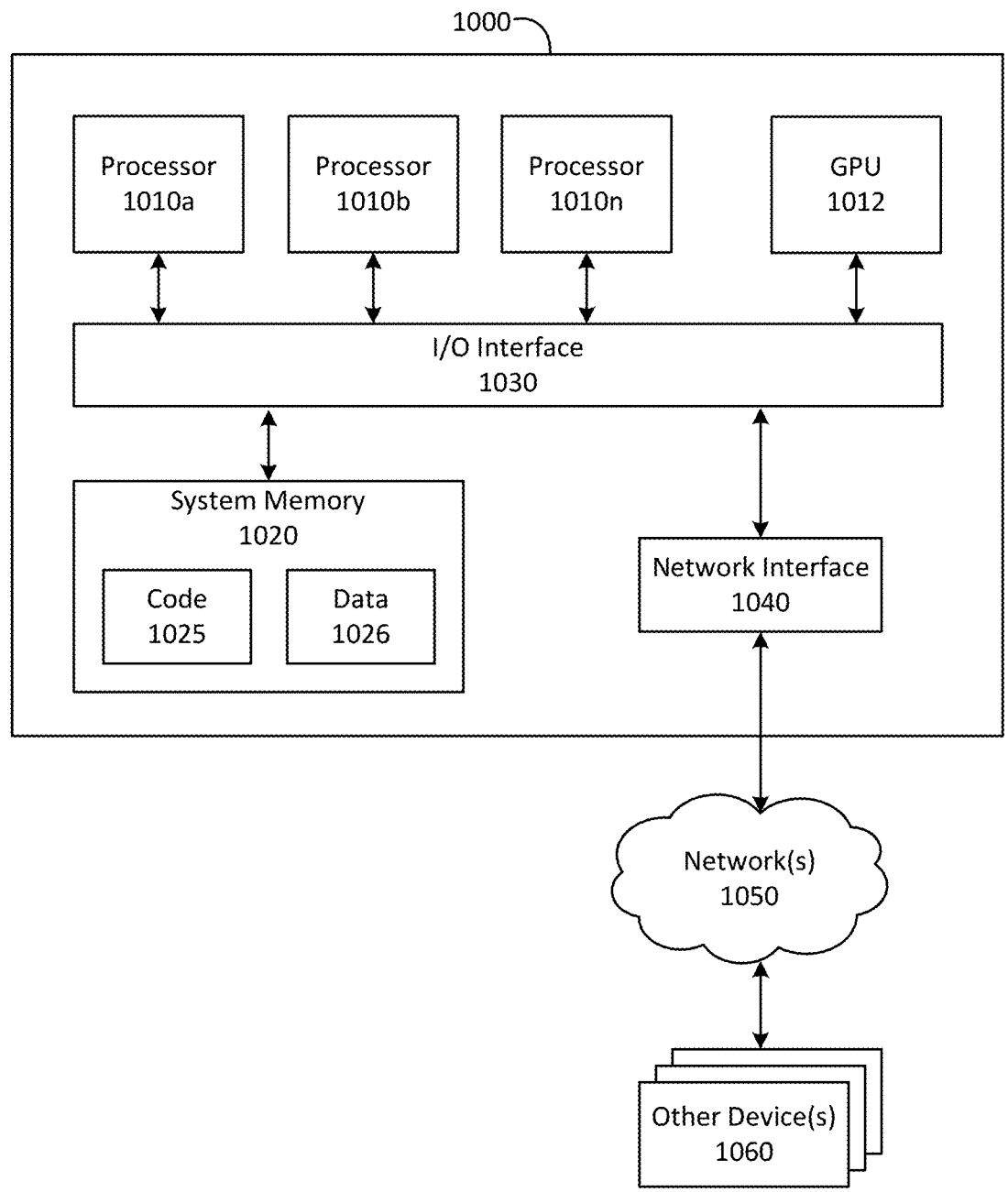
FIG. 10 is a block diagram of an example computer.

FIG. 10 depicts a general-purpose computer system that includes or is configured to access one or more computer-accessible media and that may be used in aspects, such as the components depicted in FIG. 1. With regard to the example architecture of FIG. 1, user device 102 and computing device 104 may each be implemented in an instance of the computing device 1000 of FIG. 10. In the illustrated aspect, the computing device 1000 includes one or more processors 1010a, 1010b, and/or 1010n (which may be referred herein singularly as a processor 1010 or in the plural as the processors 1010) coupled to a system memory 1020 via an input/output (I/O) interface 1030. The computing device 1000 further includes a network interface 1040 coupled to the I/O interface 1030.

In various aspects, the computing device 1000 may be a uniprocessor system including one of the processors 1010 or a multiprocessor system including several of the processors 1010 (e.g., two, four, eight, or another suitable number). The processors 1010 may be any suitable processors capable of executing instructions. For example, in various aspects, the processor(s) 1010 may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010 may commonly, but not necessarily, implement the same ISA.

In some aspects, a graphics processing unit ("GPU") 1012 may participate in providing graphics rendering and/or physics processing capabilities. A GPU may, for example, comprise a highly parallelized processor architecture specialized for graphical computations. In some aspects, the processors 1010 and the GPU 1012 may be implemented as one or more of the same type of device.

The system memory 1020 may be configured to store instructions and data accessible by the processor(s) 1010. In various aspects, the system memory 1020 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 1020 as code 1025 and data 1026.

In one aspect, the I/O interface 1030 may be configured to coordinate I/O traffic between the processor(s) 1010, the system memory 1020 and any peripherals in the device, including the network interface 1040 or other peripheral interfaces. In some aspects, the I/O interface 1030 may perform any necessary protocol, timing or other data transformations to convert data signals from one component (e.g., the system memory 1020) into a format suitable for use by another component (e.g., one or more of the processors 1010). In some aspects, the I/O interface 1030 may include support for devices attached through various types of peripheral buses, such as a variant of the Peripheral Component Interconnect (PCI) bus standard or the Universal Serial Bus (USB) standard, for example. In some aspects, the function of the I/O interface 1030 may be split into two or more separate components, such as a north bridge and a south bridge, for example. Also, in some aspects some or all of the functionality of the I/O interface 1030, such as an interface to the system memory 1020, may be incorporated directly into the processor 1010.

The network interface 1040 may be configured to allow data to be exchanged between the computing device 1000 and other devices 1060 attached to a network or networks 1050, such as other computer systems or devices, for example. In various aspects, the network interface 1040 may support communication via any suitable wired or wireless general data networks, such as types of Ethernet networks, for example. Additionally, the network interface 1040 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 1020 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to the computing device 1000 via the I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 1000 as the system memory 1020 or another type of memory. Further, a computer-accessible medium may include transmission media or signals, such as electrical, electromagnetic or digital signals, conveyed via a communication medium, such as a network and/or a wireless link, such as those that may be implemented via the network interface 1040. Portions or all of multiple computing devices, such as those illustrated in FIG. 10, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some aspects be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different aspects, including general-purpose or special-purpose computer servers, storage devices, network devices, and the like. In some aspects a client or user may be provided direct access to a resource instance, e.g., by giving a user an administrator login and password. In other aspects the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect or embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The invention claimed is:

1. A method comprising:
   granting access to a network based upon a threshold quantity of devices accessing the network and in response to a request for access to the network;
   granting access to a first service, of a plurality of services provided via the network, based upon a threshold quantity of devices accessing the first service and in response to a request for access to the first service; and
   allocating, based on a quantity of the plurality of services accessed via the network and a type of traffic associated with one or more of the quantity of the plurality of services, a network resource to the first service.

2. The method of claim 1, wherein the network comprises a local area network, and wherein the plurality of services comprise one or more managed services.

3. The method of claim 1, wherein the plurality of services comprise one or more of a video service, a voice service, or a high-speed data service.

4. The method of claim 1, wherein the allocated network resource comprises bandwidth.

5. The method of claim 1, wherein the allocating the network resource to the first service comprises allocating bandwidth to the first service based upon a dynamic partition scheme.

6. The method of claim 1, wherein the allocating the network resource to the first service comprises allocating time-division multiplexing slots to the plurality of services in a prioritized manner.

7. The method of claim 1, further comprising allocating the network resource to a second service of the plurality of services.

8. The method of claim 7, wherein the second service is distinct from the first service.

9. The method of claim 1, wherein the first service comprises a video service and wherein the method further comprises receiving a selection of a maximum bitrate for initial provision of the first service based at least on the allocated network resource or a link condition.

10. A device comprising:
    one or more processors; and
    memory storing instructions that, when executed by the one or more processors, cause the device to:
    grant access to a network based upon a threshold quantity of devices accessing the network and in response to a request for access to the network;
    grant access to a first service, of a plurality of services provided via the network, based upon a threshold quantity of devices accessing the first service and in response to a request for access to the first service; and
    allocate, based on a quantity of the plurality of services accessed via the network and a type of traffic associated with one or more of the quantity of the plurality of services, a network resource to the first service.

11. The device of claim 10, wherein the network comprises a local area network and the one or more processors are comprised in one or more user devices.

12. The device of claim 10, wherein the plurality of services comprise one or more of a video service, a voice service, or a high-speed data service.

13. The device of claim 10, wherein the allocated network resource comprises bandwidth.

14. The device of claim 10, wherein the first service comprises a video service and wherein the instructions, when further executed by the one or more processors, cause the device to:
    select a maximum bitrate for initial provision of the first service based at least on the allocated network resource or a link condition.

15. A non-transitory computer-readable medium storing instructions that, when executed, cause:
    granting access to the network based upon a threshold quantity of devices accessing the network and in response to a request for access to a network;
    granting access to a first service, of a plurality of services provided via the network, based upon a threshold quantity of devices accessing the first service and in response to a request for access to the first service; and
    allocating, based on a quantity of the plurality of services accessed via the network and a type of traffic associated with one or more of the quantity of the plurality of services, a network resource to the first service.

16. The non-transitory computer-readable medium of claim 15,
    wherein the instructions, when further executed, cause:
    allocating the network resource to a second service of the plurality of services.

17. The non-transitory computer-readable medium of claim 16,
    wherein the instructions, when further executed, cause:
    determining that the network resource allocated to the second service is below a total network resource allocation available to the plurality of services.

* * * * *